(12) United States Patent
Okano

(10) Patent No.: US 11,025,151 B2
(45) Date of Patent: Jun. 1, 2021

(54) LINEAR DRIVE MECHANISM AND SHAPE MEASURING MACHINE

(71) Applicant: Tokyo Seimitsu Co., Ltd., Tokyo (JP)

(72) Inventor: Takahiro Okano, Tsuchiura (JP)

(73) Assignee: TOKYO SEIMITSU CO., LTD., Tokyo (JP)

( * ) Notice: Subject to any disclaimer, the term of this patent is extended or adjusted under 35 U.S.C. 154(b) by 0 days.

(21) Appl. No.: 16/902,714

(22) Filed: Jun. 16, 2020

(65) Prior Publication Data

US 2020/0313535 A1    Oct. 1, 2020

Related U.S. Application Data

(63) Continuation of application No. PCT/JP2018/040880, filed on Nov. 2, 2018.

(30) Foreign Application Priority Data

Feb. 2, 2018 (JP) .............................. JP2018-017273

(51) Int. Cl.
*H02K 41/02* (2006.01)
*G01B 5/20* (2006.01)
(Continued)

(52) U.S. Cl.
CPC .............. *H02K 41/02* (2013.01); *G01B 5/201* (2013.01); *G01B 21/20* (2013.01); *H02K 7/102* (2013.01); *B23Q 5/28* (2013.01)

(58) Field of Classification Search
CPC .......... G01B 5/00; G01B 21/00; G01B 5/201; G01B 5/20; B23Q 5/28; H02K 7/102; H02K 41/02; H02P 7/02
See application file for complete search history.

(56) References Cited

U.S. PATENT DOCUMENTS 5,180,955 A * 1/1993 Karidis .................... B23Q 5/28
    310/12.04
5,909,013 A * 6/1999 Dlugos ............... G01G 19/005
    177/25.11
(Continued)

FOREIGN PATENT DOCUMENTS

EP    2 950 037 A1    12/2015
JP    9-163715 A    6/1997
(Continued)

OTHER PUBLICATIONS

International Search Report issued in PCT/JP2018/040880 (PCT/ISA/210), dated Dec. 4, 2018.
(Continued)

*Primary Examiner* — Naishadh N Desai
(74) *Attorney, Agent, or Firm* — Birch, Stewart, Kolasch & Birch, LLP

(57) ABSTRACT

A linear drive mechanism which moves a detector having sensitivity in a first axial direction, relatively to a workpiece in a second axial direction orthogonal to the first axial direction, the linear drive mechanism includes: a drive shaft extending in the second axial direction; a mover which is supported in a non-contact fashion by the drive shaft and configured to move along the drive shaft integrally with the detector or the workpiece; a guide provided at a position deviated relative to the drive shaft in a third axial direction orthogonal to both the first axial direction and the second axial direction, the guide parallel to the drive shaft; and a resistance force generator which is provided on one of the mover and the guide, and is in contact with the other of the mover and the guide, the resistance force generator generates a resistance force which resists against movement of the mover.

11 Claims, 15 Drawing Sheets

(51) Int. Cl.
    *G01B 21/20*     (2006.01)
    *H02K 7/102*     (2006.01)
    *B23Q 5/28*     (2006.01)

(56) References Cited

U.S. PATENT DOCUMENTS

| | | |
|---|---|---|
| 6,135,029 A | 10/2000 | Oberjohn |
| 6,469,409 B1 * | 10/2002 | Takada ................. B23Q 1/28 |
| | | 310/12.19 |

FOREIGN PATENT DOCUMENTS

| | | |
|---|---|---|
| JP | 10-154012 A | 6/1998 |
| JP | 11-98886 A | 4/1999 |
| JP | 2000-92813 A | 3/2000 |
| JP | 2012-78344 A | 4/2012 |
| JP | 2015-225011 A | 12/2015 |
| WO | WO 2013/065180 A1 | 5/2013 |
| WO | WO 2017/080612 A1 | 6/2017 |

OTHER PUBLICATIONS

Written Opinion of the International Searching Authority issued in PCT/JP2018/040880 (PCT/ISA/237), dated Dec. 4, 2018.
Extended European Search Report dated Jan. 27, 2021 in counterpart European Patent Application No. 18904198.1.

* cited by examiner

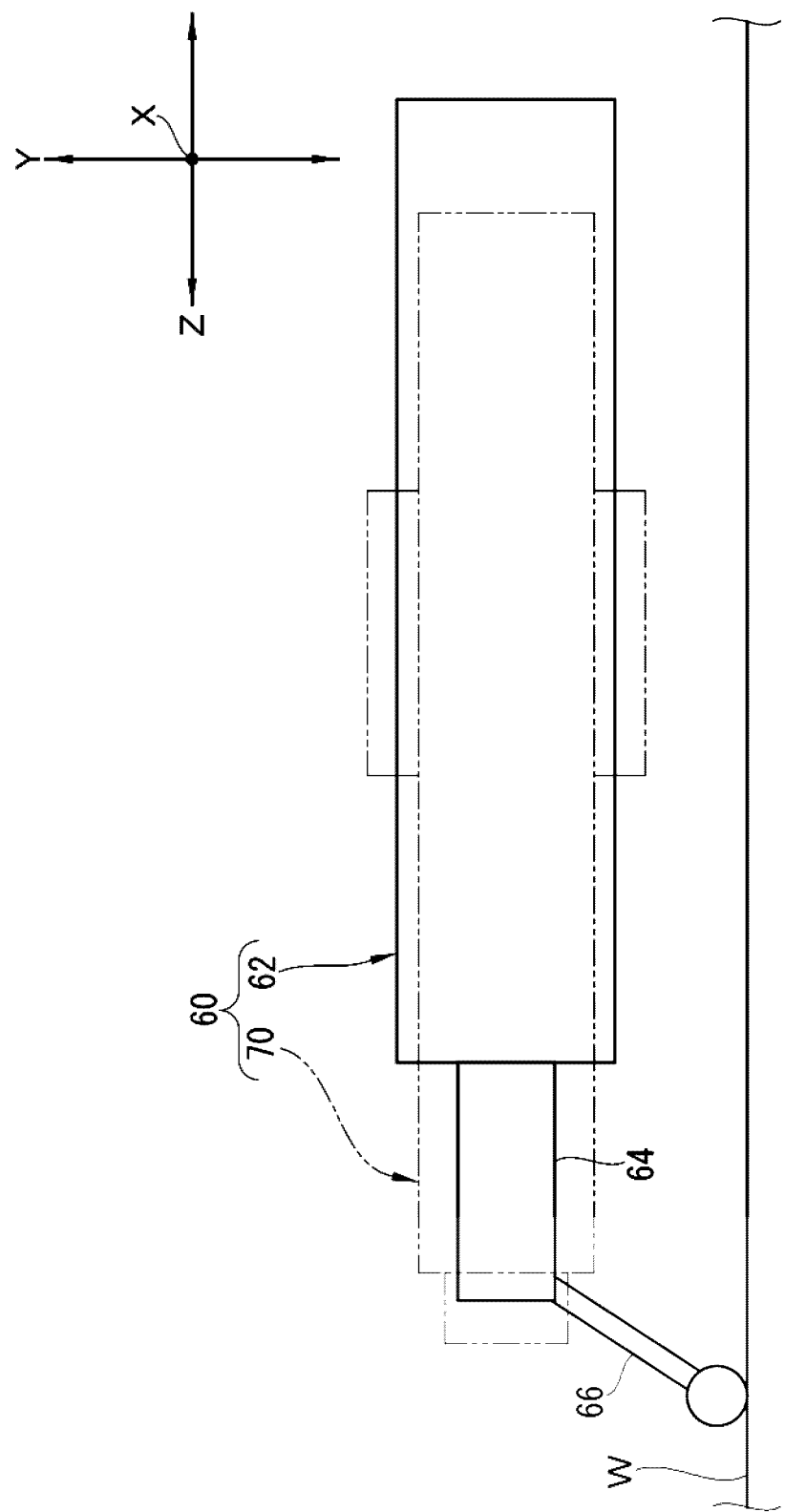

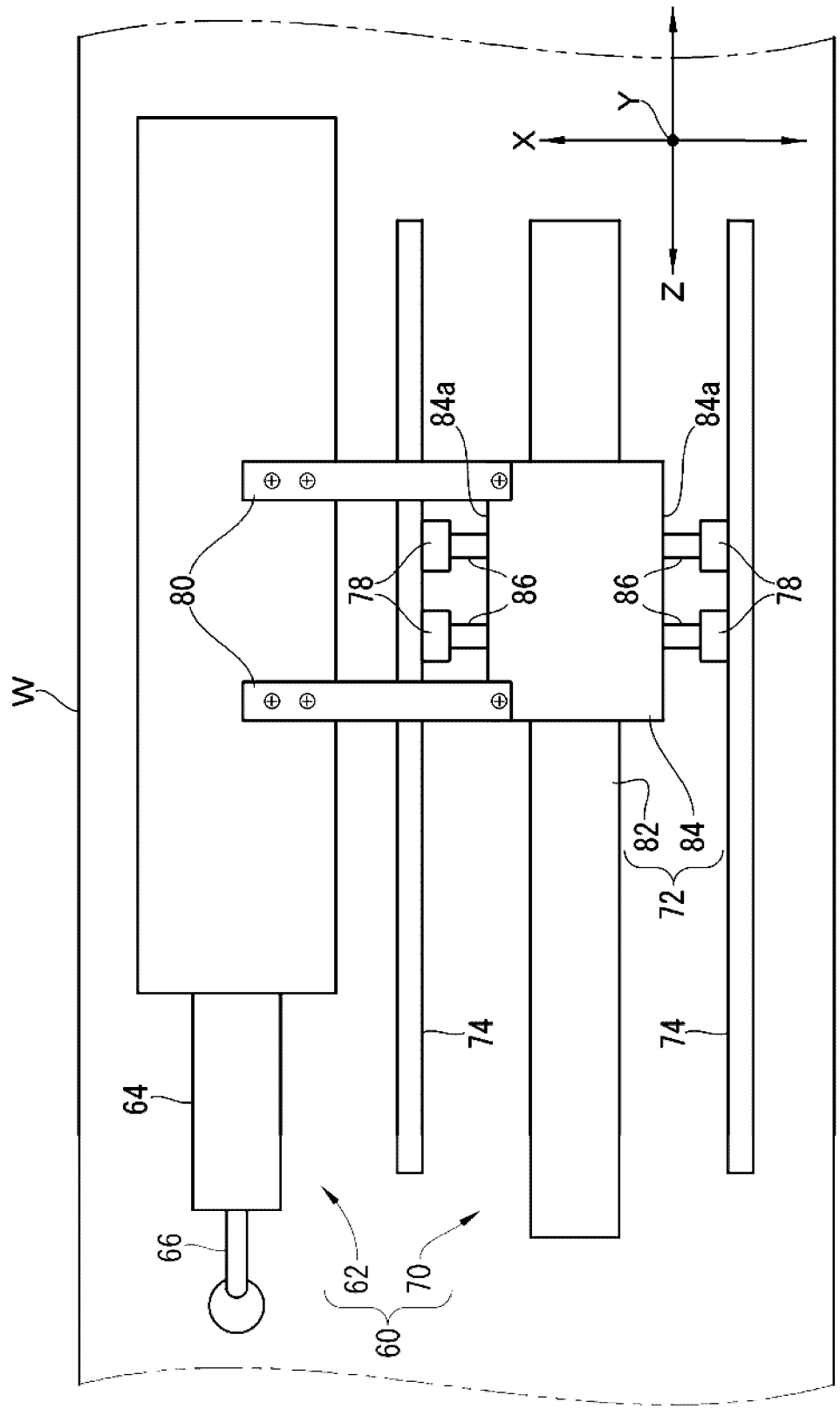

LINEAR DRIVE MECHANISM AND SHAPE MEASURING MACHINE

CROSS-REFERENCE TO RELATED APPLICATIONS

The present application is a Continuation of PCT International Application No. PCT/JP2018/040880 filed on Nov. 2, 2018 claiming priority under 35 U.S.C § 119(a) to Japanese Patent Application No. 2018-017273 filed on Feb. 2, 2018. Each of the above applications is hereby expressly incorporated by reference, in its entirety, into the present application.

BACKGROUND OF THE INVENTION

Field of the Invention

The present invention relates to a linear drive mechanism for a detector and to a shape measuring machine including the linear drive mechanism.

Description of the Related Art

There is known a shape measuring machine which moves a detector relatively to a workpiece in a state in which a contact type detector such as a stylus is held in contact with a measuring surface (surface to be measured) of the workpiece, to measure various shapes of the workpiece (including roundness, straightness, surface roughness, swell, and dimension). Also, well known is a shape measuring machine which uses a non-contact type detector such as an optical probe, instead of the contact type detector, to measure various shapes of a workpiece.

Such a shape measuring machine is provided with various types of linear drive mechanism which moves the detector in a linear direction. As examples of the linear drive mechanism, a ball screw mechanism using a ball screw (See Japanese Patent Application Laid-Open No. H10-154012, hereinafter referred to as "PTL 1") and a linear motor mechanism using a linear motor (See Japanese Patent Application Laid-Open No. H11-098886, hereinafter referred to as "PTL 2") are well known. Further, PTL 2 discloses an example in which a linear motor mechanism is combined with an air bearing.

CITATION LIST

PTL 1: Japanese Patent Application Laid-Open No. H10-154012

PTL 2: Japanese Patent Application Laid-Open No. H11-098886

SUMMARY OF THE INVENTION

The ball screw mechanism disclosed in PTL 1 is advantageous in that since the rigidity of the ball screw is high, it is durable to external force, and can provide high positioning accuracy. However, as the ball screw rotates, the ball screw mechanism involves generation of axial run-out in the ball screw (run-out in a radial direction of the ball screw). Thus, in a case where the ball screw mechanism is adopted as the linear drive mechanism for the detector, the linear movement accuracy of the detector deteriorates so that the measurement accuracy of the detector deteriorates.

In the linear motor drive mechanism disclosed in PTL 2, no vibration and resistance are generated when the mover of the linear motor moves. Therefore, the linear motor drive mechanism has advantages that the linear movement accuracy of the mover is high, and that the positioning accuracy of this mover is also high. However, because the linear motor drive mechanism has small (poor) retaining force for retaining the position of the mover, the mover is moved by a slight external force. There is a controlling method of detecting the position of the mover and restoring the mover to the original position when the mover is inadvertently moved; however, even by this method, it is impossible to prevent the mover from being moved by a slight external force. Thus, in a case where the detector is moved by the linear drive mechanism, the detector is moved under the influence of the weight of the cable, piping or the like and of the tension or the like. This may deteriorate the positioning accuracy for the detector so as to deteriorate the measurement accuracy of the detector.

The present invention has been made in view of the abovementioned circumstances. The present invention aims to provide a linear drive mechanism which can prevent deterioration in the measurement accuracy of the detector, and provide a shape measuring machine including such a linear drive mechanism.

To achieve the abovementioned object, a linear drive mechanism according to the present invention which moves a contact type or a non-contact type detector having sensitivity in a first axial direction, relatively to a workpiece in a second axial direction orthogonal to the first axial direction, the linear drive mechanism includes: a drive shaft extending in the second axial direction; a mover which is supported in a non-contact fashion by the drive shaft and configured to move along the drive shaft integrally with the detector or the workpiece; a guide provided at a position deviated relative to the drive shaft in a third axial direction orthogonal to both the first axial direction and the second axial direction, the guide parallel to the drive shaft; and a resistance force generating portion (resistance force generator) which is provided on one of the mover and the guide, and is in contact with the other of the mover and the guide, the resistance force generating portion configured to generate a resistance force which resists against movement of the mover.

In this linear drive mechanism, it is possible to regulate the direction of a vibration generated through the movement of the mover along the drive shaft in a direction (the third axial direction) orthogonal to the sensitivity direction of the detector (the first axial direction) while securing the positioning accuracy for the mover. Therefore, it is possible to suppress a reduction in the measurement accuracy of the detector.

According to another mode of the present invention, in the linear drive mechanism the guide is provided on each of one direction side and another direction side of the third axial direction with respect to the drive shaft, and the resistance force generating portion is provided for each guide. As a result, it is possible to suppress a reduction in the measurement accuracy of the detector.

According to another mode of the present invention, the linear drive mechanism includes an adjustment controller configured to adjust magnitude of the resistance force generated by the resistance force generating portion. In the linear drive mechanism, in a case where the mover halts, the resistance force is increased to reliably prevent the mover from being moved by an external force, and in a case where the mover is moving, the resistance force is reduced to suppress vibration of the mover. Further, it is possible to adjust the moving speed of the mover.

According to another mode of the present invention, in the linear drive mechanism, the resistance force generating portion is provided on the mover, and holds the guide in the third axial direction. As a result, it is possible to prevent generation of deflection, deformation, movement, etc. of the guide.

According to another mode of the present invention, in the linear drive mechanism, the resistance force generating portion is a friction member (friction pad). As a result, it is possible to regulate the direction of the vibration generated through the movement of the mover on the drive shaft in the third axial direction while securing the positioning accuracy for the mover.

According to another mode of the present invention, in the linear drive mechanism, the friction member is replaceably provided on the one of the mover and the guide. As a result, it is possible to improve the maintenance property of the linear drive mechanism.

According to another mode of the present invention, the linear drive mechanism includes an urging member (urger) configured to urge the friction member toward the other of the mover and the guide. As a result, even when the friction member has been worn, it is possible to maintain a state in which the friction member is pressed against the other of the mover and the guide with a fixed urging force. Therefore, it is possible to maintain a substantially fixed resistance force due to the friction member.

According to another mode of the present invention, in the linear drive mechanism, the friction member is provided on the mover, and the guide has a columnar shape extending in the second axial direction. As a result, it is possible to adjust the resistance force due to the friction member solely by changing the contact position of the friction member with respect to the guide in the first axial direction.

According to another mode of the present invention, in the linear drive mechanism, the friction member is provided on the mover, and the guide includes a belt body having a surface orthogonal to the third axial direction, and a tension imparting portion (tension imparter) imparting tension to the belt body in the first axial direction or the second axial direction. As a result, it is possible to make the resistance force due to the friction member uniform.

To achieve the abovementioned object, a shape measuring machine according to the present invention which measures a shape of a workpiece, the shape measuring machine includes: a contact type or a non-contact type detector having sensitivity in a first axial direction; and the linear drive mechanism as described above. In this shape measuring machine, it is possible to suppress a reduction in the measurement accuracy of the detector.

According to another mode of the present invention, in a case where the workpiece is of a columnar or a cylindrical shape, and the shape of the workpiece to be measured is the roundness of the workpiece in the shape measuring machine, the shape measuring machine includes a workpiece rotating unit (workpiece rotator) configured to rotate the workpiece around a rotation axis parallel to the second axial direction, the drive shaft is provided at a position separated from the rotation axis in the first axial direction, and the mover retains the detector at a position facing an outer peripheral surface of the workpiece in the first axial direction. As a result, it is possible to suppress a reduction in the measurement accuracy of the roundness measurement of the workpiece by the detector.

The linear drive mechanism and the shape measuring machine according to the present invention can prevent reduction in the measurement accuracy of the detector.

BRIEF DESCRIPTION OF THE DRAWINGS

FIG. 14 is a side view of a detector of a surface shape measuring machine.
FIG. 15 is a plan view of a linear drive mechanism of the surface shape measuring machine.

DESCRIPTION OF EMBODIMENTS

[Structure of a Roundness Measuring Machine]

Figure 1:
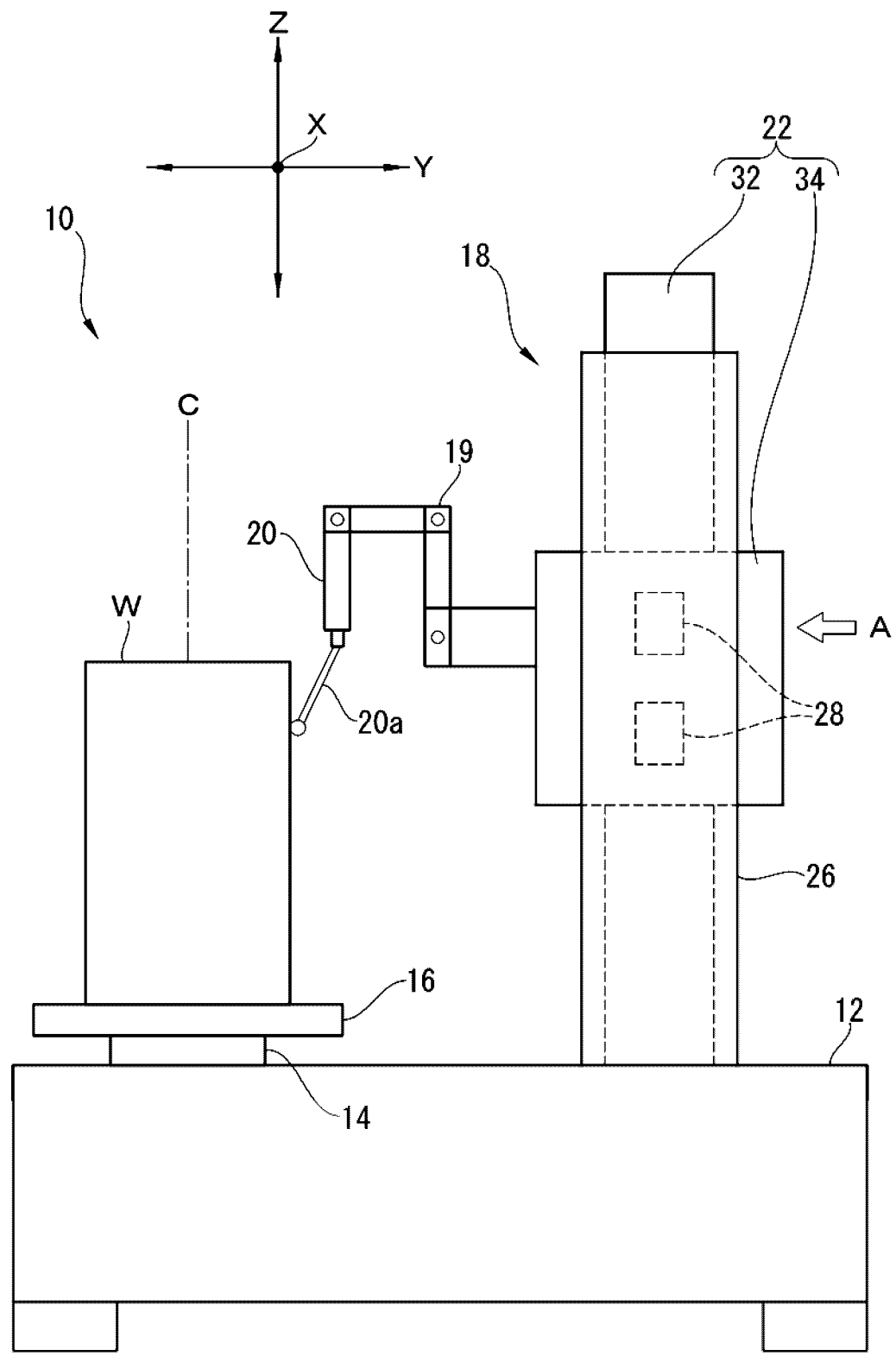
FIG. 1 is a side view of a roundness measuring machine.
Figure 2:
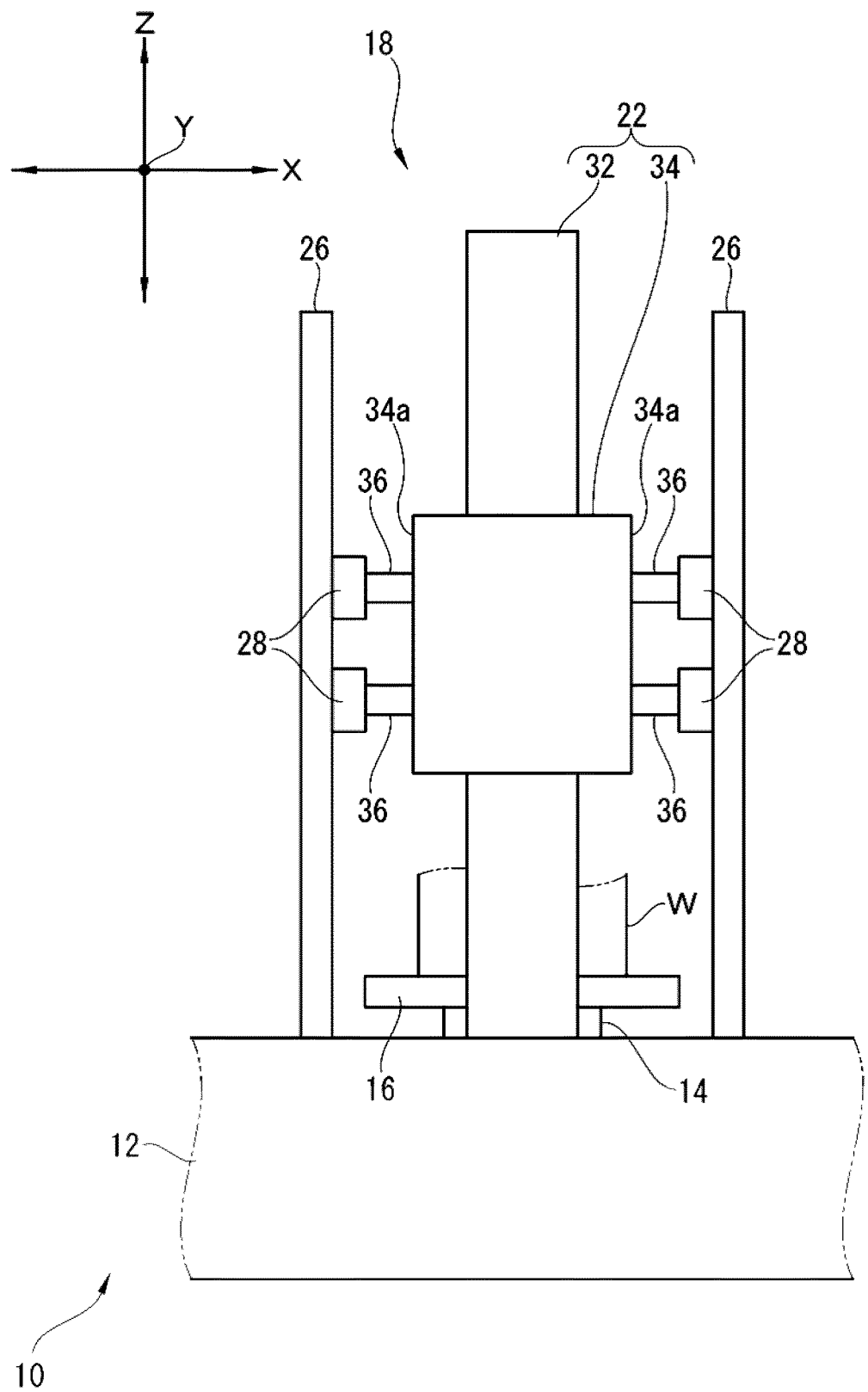
FIG. 2 is a side view of the roundness measuring machine as seen from direction A of FIG. 1.
Figure 3:
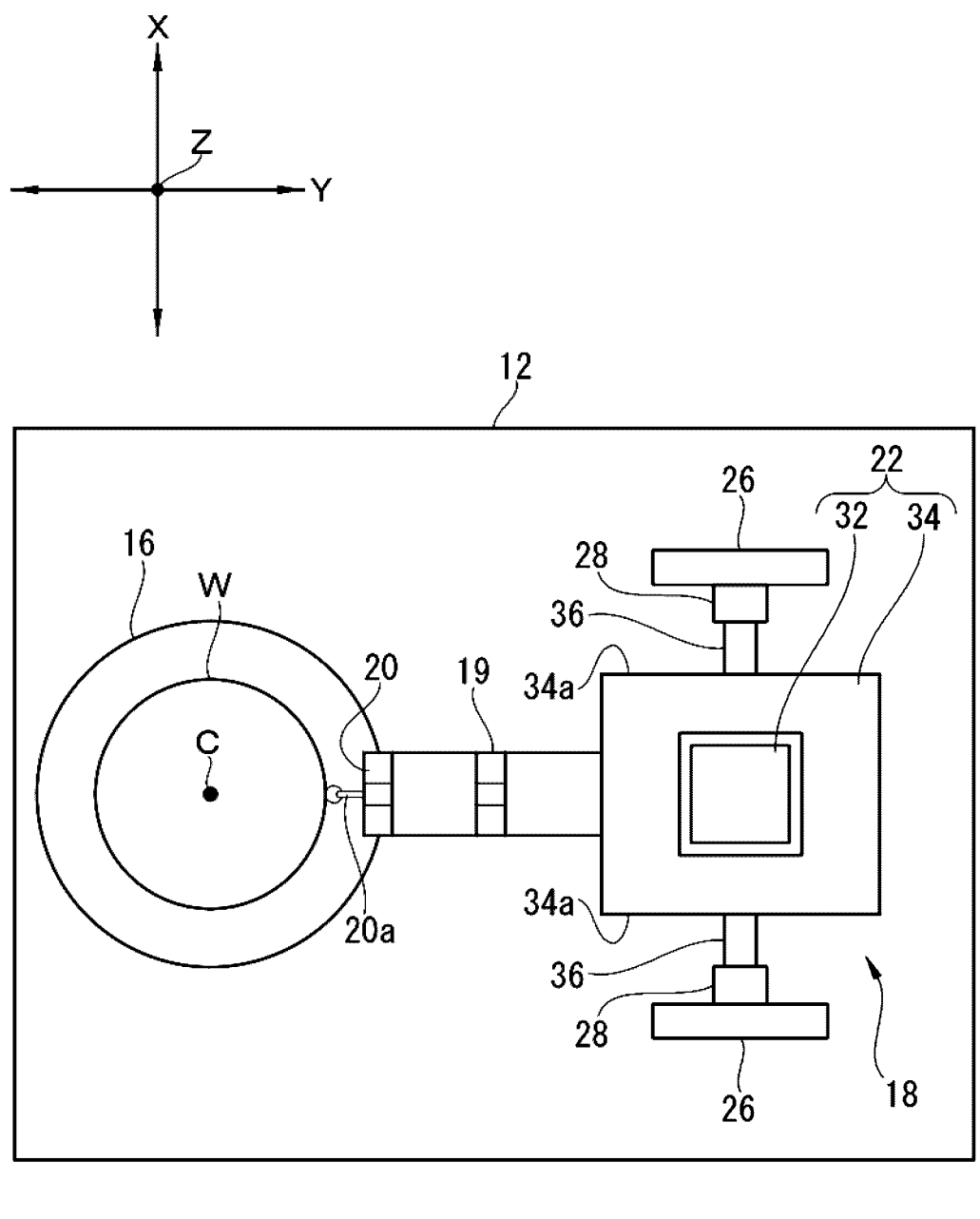
FIG. 3 is a plan view of the roundness measuring machine.

FIG. 1 is a side view of a roundness measuring machine 10 corresponding to the shape measuring machine of the present invention. FIG. 2 is a side view, as seen from direction A of FIG. 1, of the roundness measuring machine 10. FIG. 3 is a plan view of the roundness measuring machine 10. In the drawings, an X-axis direction (a third axial direction of the present invention), a Y-axis direction (a first axial direction of the present invention), and a Z-axis direction (a second axial direction of the present invention), are orthogonal to each other.

The roundness measuring machine 10 measures straightness and roundness (cylindricality) of a columnar (cylindrical) workpiece W. The roundness measuring machine 10 includes a base 12, a table rotation mechanism 14, a table 16, a linear drive mechanism 18, an arm 19, and a detector 20.

The base 12 is a support stand (base stand) configured to support respective portions of the roundness measuring machine 10. Although not shown, the table rotation mechanism 14 (which corresponds to a workpiece rotation portion of the present invention) includes an air bearing configured to support the table 16 so as to be rotatable around a rotation axis C parallel to the Z-axis direction, and a rotation drive mechanism such as a motor configured to rotate the table 16 around the rotation axis C. As a result, the table 16 is rotated around the rotation axis C by the table rotation mechanism 14.

The table 16 is of a disc-like shape, and is retained on the air bearing of the table rotation mechanism 14 such that the center the table 16 coincides with the rotation axis C. A workpiece W is placed on the upper surface of the table 16. The workpiece W is placed on the upper surface of the table 16 such that the position of the shape center of the workpiece W substantially coincides with the rotation axis C.

The linear drive mechanism 18 includes a linear motor 22, a pair of guides 26, and a friction pad 28.

The linear motor 22 has a well-known linear motor (shaft motor) structure. This linear motor 22 includes a drive shaft 32 which is a stator (also referred to as the shaft) and a carriage 34 which is a mover.

The drive shaft 32 is provided at a position shifted in the Y-axis direction from the table 16 on the base 12, and has a shape extending in the Z-axis direction. This drive shaft 32 has a structure in which a plurality of permanent magnets (not shown) are joined together in a well-known layout (a layout in which adjacent permanent magnets are arranged so that the same poles of the magnets face each other (N-poles to N-poles or S-poles to S-poles)).

The carriage 34 is of a substantially tubular shape extending in the Z-axis direction, and is supported in a non-contact fashion by the drive shaft 32 so as to be movable in the Z-axis direction. This carriage 34 is provided with a plurality of coils (e.g., u-layer, v-layer, and w-layer) spirally wound along the Z-axis direction around the drive shaft 32. When an electric current is applied to each coil of the carriage 34, there is generated a thrust (drive force) which moves the carriage 34 along the Z-axis direction due to the mutual action of the magnetic flux generated from each magnet of the drive shaft 32 and the electric current flowing through each coil (Fleming's left-hand rule). The structure and function of the linear motor 22 are well-known technique, so a detailed description thereof will be left out.

Guide opposing surfaces 34a opposite a pair of guides 26, described below, of the carriage 34 are provided with a plurality of pad support members 36 configured to support a friction pads 28, described below (See FIGS. 2 and 3).

The arm 19 is provided on the side of the surface of the carriage 34 opposite the workpiece W. The detector 20 is mounted to the distal end portion of this arm 19. The arm 19 has a structure capable of arbitrarily adjusting the position of the detector 20 in the Y-axis direction and the attitude of the detector 20. There are no particular restrictions regarding the shape and structure of the arm 19 so long as the arm 19 can, at least, adjust the position in the Y-axis direction of the detector 20.

The detector 20 has a stylus 20a (also referred to as a probe or sensing pin), and a displacement detecting portion such as a differential transformer (not shown). The detector 20 detects displacement of the stylus 20a which moves in the front-rear direction along the Y-axis direction. That is, the detector 20 has sensitivity in the Y-axis direction. The detector 20 outputs a displacement detection signal (electric signal) which indicates displacement of the stylus 20a to a data processing device (not shown).

In a case where the straightness of the workpiece W is measured, the linear motor 22 and the arm 19 are driven to bring the stylus 20a into contact with the outer peripheral surface of the workpiece W. Then, the linear motor 22 is driven to move the carriage 34 in the Z-axis direction, whereby the outer peripheral surface of the workpiece W is traced along the Z-axis direction by the stylus 20a of the detector 20. As a result, the displacement detection signal corresponding to a single tracing (one trace) is output from the detector 20 to the data processing device (not shown). The data processing device analyzes the detection signal input from the detector 20 by a well-known method, and computes the straightness of the workpiece W.

Similarly to the straightness measurement, when the roundness of the workpiece W is measured, the stylus 20a is brought into contact with the outer peripheral surface of the workpiece W. Then, the table 16 and the workpiece W are rotated around the rotation axis C by the table rotation mechanism 14, whereby the outer peripheral surface of the workpiece W is traced along the circumferential direction of the workpiece W by the stylus 20a of the detector 20. As a result, the displacement detection signal corresponding to a single rotation (one rotation) of the workpiece W is output from the detector 20 to the data processing device (not shown). This data processing device analyzes the detection signal input from the detector 20 by a well-known method, and computes the roundness of the workpiece W.

The pair of guides 26 are formed, for example, of a metal material. The pair of guides 26 respectively have a plate shape parallel to the YZ-plane and extending in the Z-axis direction. The pair of guides 26 are provided on the base 12 such that they are respectively situated on one direction side and the other direction side in the X-axis direction with respect to the drive shaft 32 of the linear motor 22. In other words, the drive shaft 32 is provided on the base 12 so as to be situated between the pair of guides 26 in the X-axis direction.

The friction pads 28 correspond to the friction members (resistance force generating portions) of the present invention, and are formed of resin material such as plastic. There are no particular restrictions regarding the material, shape, etc. of the friction pads 28. Each friction pad 28 is supported individually for each pad support member 36 which is provided on each guide opposing surface 34a of the carriage 34. That is, a plurality of friction pads 28 are respectively supported by the guide opposing surfaces 34a.

The pad support members 36 bring the friction pads 28, respectively, in contact with the opposing guides 26 with a predetermined pressure. Thus, the carriage 34 is clamped in the X-axis direction by the pair of guides 26 via the respective friction pads 28. As a result, in a case where the carriage 34 of the linear motor 22 is moved in the Z-axis direction along the drive shaft 32, the friction pads 28 are slidably in contact with the guides 26 respectively opposing the friction pads 28, whereby a resistance force (dynamic friction force) is generated in a direction opposite the moving direction of the carriage 34. In a case where the carriage 34 halts on the drive shaft 32, the friction pads 28 come into contact with the opposing guides 26, whereby a resistance force (static friction force) regulating the movement of the carriage 34 is generated.

In the present embodiment, the magnitudes of the resistance forces (the dynamic friction force and the static friction force) are adjusted such that the resistance force (dynamic friction force) during movement of the carriage 34 does not hinder the movement of the carriage 34, and that when the carriage 34 halts, the carriage 34 is locked at that stop position by the resistance force (static friction force). For example, by adjusting the pressure when bringing the friction pads 28 into contact with the opposing guides 26, the material of the friction pads 28, the material of the guides 26, etc., it is possible to adjust each resistance force.

[Effect of the Present Embodiment: Straightness Measurement]

In this way, the linear drive mechanism 18 includes the pair of guides 26 arranged so as to put (sandwich) the drive shaft 32 therebetween in the X-axis direction, and the friction pads 28 which are provided on the carriage 34 and respectively come into contact with the guides 26. Therefore, when the carriage 34 halts, the carriage 34 can be locked at that stop position by the friction pads 28. As a result, when the carriage 34 halts, it is possible to prevent the carriage 34 from being moved by a slight external force. Thus, it is possible to secure the positioning accuracy of the linear motor 22.

Further, in the linear drive mechanism 18, when the carriage 34 is moving, vibration in the X-axis direction is generated in the carriage 34 due to the sliding contact between the friction pads 28 and the guides 26. Thus, the arm 19 and the detector 20 retained by the carriage 34 also vibrate in the X-axis direction. However, as stated above, the sensitivity direction of this detector 20 is the Y-axis direction. Thus, even in a case where, when the carriage 34 is moving, the detector 20 vibrates in the X-axis direction, which is orthogonal to the Y-axis direction that is the sensitivity direction of the detector 20, the influence of the detector 20 on the measurement accuracy in the straightness measurement is very small.

As described above, in the linear drive mechanism 18 of the present embodiment, the arrangement of the guides 26 and the friction pads 28 are adjusted so as to regulate the direction of the vibration generated by the sliding contact between the guides 26 and the friction pads 28 in the direction (X-axis direction) orthogonal to the sensitivity direction (Y-axis direction) of the detector 20, while securing the positioning accuracy of the linear motor 22. As a result, it is possible to suppress a reduction in the measurement accuracy at the time of the straightness measurement of the workpiece W by the detector 20.

[Effect of the Present Embodiment: Roundness Measurement]

In the linear drive mechanism 18 of the present embodiment, in a case where the detector 20 is moved in the Z-axis direction via the carriage 34, the detector 20 vibrates in the X-axis direction as described above. Thus, in a case where the position in the Z-axis direction of the detector 20 is adjusted before the roundness measurement is started, the contact position of the stylus 20a on the outer peripheral surface of the workpiece W may be deviated in the X-axis direction from a predetermined reference position due to the vibration in the X-axis direction of the detector 20. However, as described in detail below, the positional deviation gives small influence on the roundness measurement result.

Figure 4:
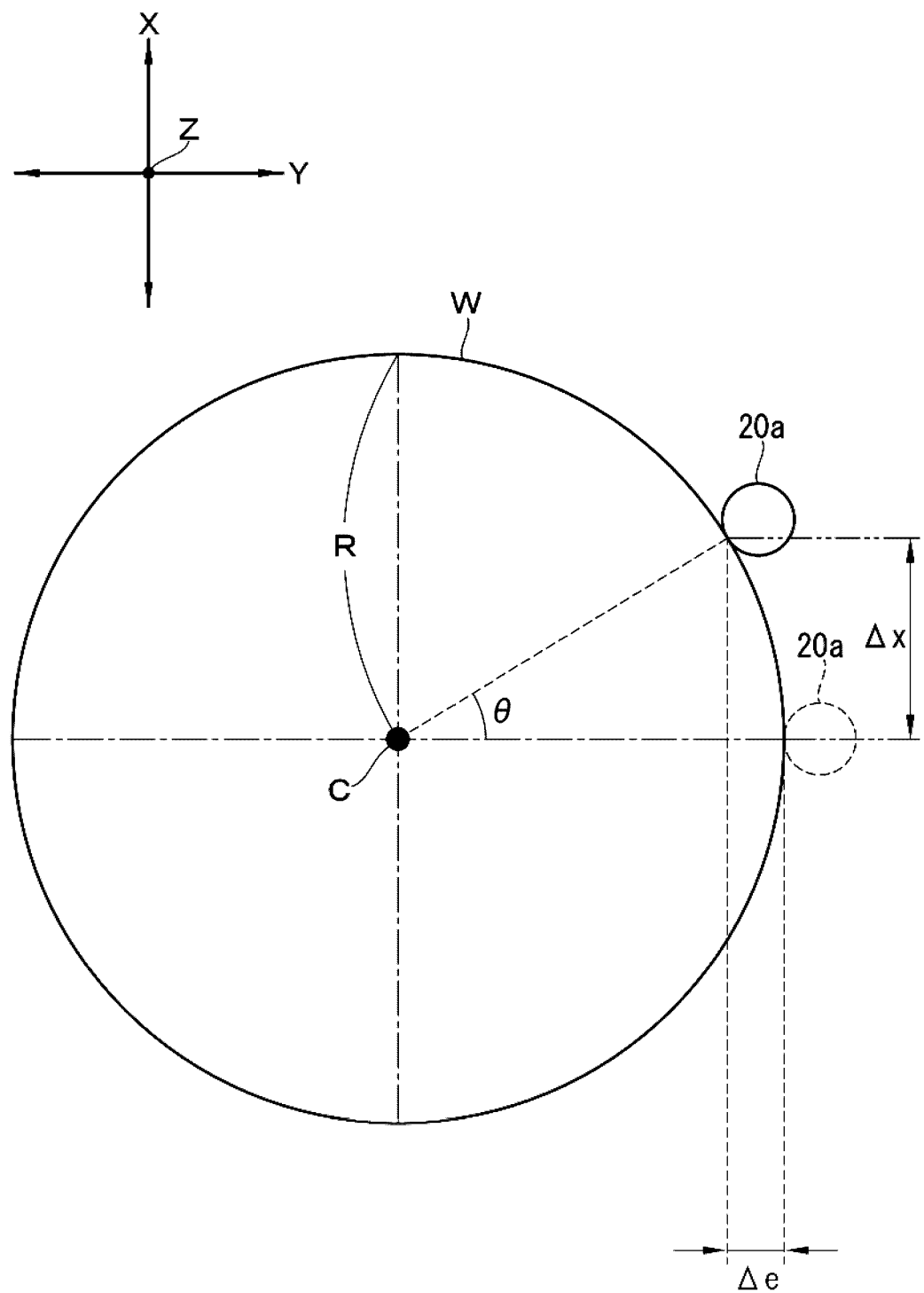
FIG. 4 is an enlarged view of the upper surface of a workpiece and a distal end portion of a stylus in roundness measurement.

FIG. 4 is an enlarged view of the upper surface of the workpiece W and the distal end portion of the stylus 20a at the time of roundness measurement. FIG. 4 illustrates the influence of the positional deviation in the X-axis direction of the stylus 20a with respect to the workpiece W on the roundness measurement.

As shown in FIG. 4, in a case where the contact position of the distal end portion of the stylus 20a with respect to the workpiece W is deviated in the X-axis direction by $\Delta x$ (as indicated by the solid-line circle) from a reference position (indicated by the dotted-line circle) due to the vibration of the detector 20 in X-axis direction, the contact position of the stylus 20a with respect to the workpiece W is deviated by $\Delta e$ in the Y-axis direction. This $\Delta e$ corresponds to the measurement error when performing roundness measurement by the detector 20. In this case, the X-axis direction is the generatrix deviation direction (deviation direction from the generatrix), and $\Delta x$ is also referred to as the generatrix deviation amount (See Japanese Patent Application Laid-Open No. 2016-017780).

Here, in a case where the radius of the workpiece W is R, the θ in the drawing is expressed by the following formula 1, and the measurement error $\Delta e$ is expressed by the following formula 2.

$$\sin \theta = \Delta x/R \quad \text{[Formula 1]}$$

$$\Delta e = R(1-\cos \theta) = R \cdot 2 \cdot \sin^2(\theta/2) \quad \text{[Formula 2]}$$

Since the deviation amount $\Delta x$ is minute, θ is also minute. In this case, the relationship: sin θ is nearly equal to θ holds true, so that the above formula 1 can be transformed into the following formula 3.

$$\theta = \Delta x/R \quad \text{[Formula 3]}$$

Next, by substituting the relationship of formula 3 for the above formula 2, the measurement error $\Delta e$ can be expressed by the following formula 4 or 5.

$$\Delta e = R \cdot 2 \cdot (\theta/2)^2 = R \cdot \theta^2/2 \quad \text{[Formula 4]}$$

$$\Delta e = \Delta x^2/2R \quad \text{[Formula 5]}$$

As described above, the positional deviation amount $\Delta x$ is minute ($\Delta x \ll 1$), so that as shown in the above formula 5, etc., the measurement error $\Delta e$ is very small. The larger the radius R of the workpiece W, the smaller the measurement error $\Delta e$.

In this way, in the linear drive mechanism 18 of the present embodiment, the direction of the vibration of the detector 20 generated when the carriage 34 and the detector 20 are moved in the Z-axis direction is regulated to the X-axis direction (the generatrix deviation direction), whereby it is possible to diminish the measurement error $\Delta e$ when performing roundness measurement by the detector 20.

Modification 1

Figure 5:
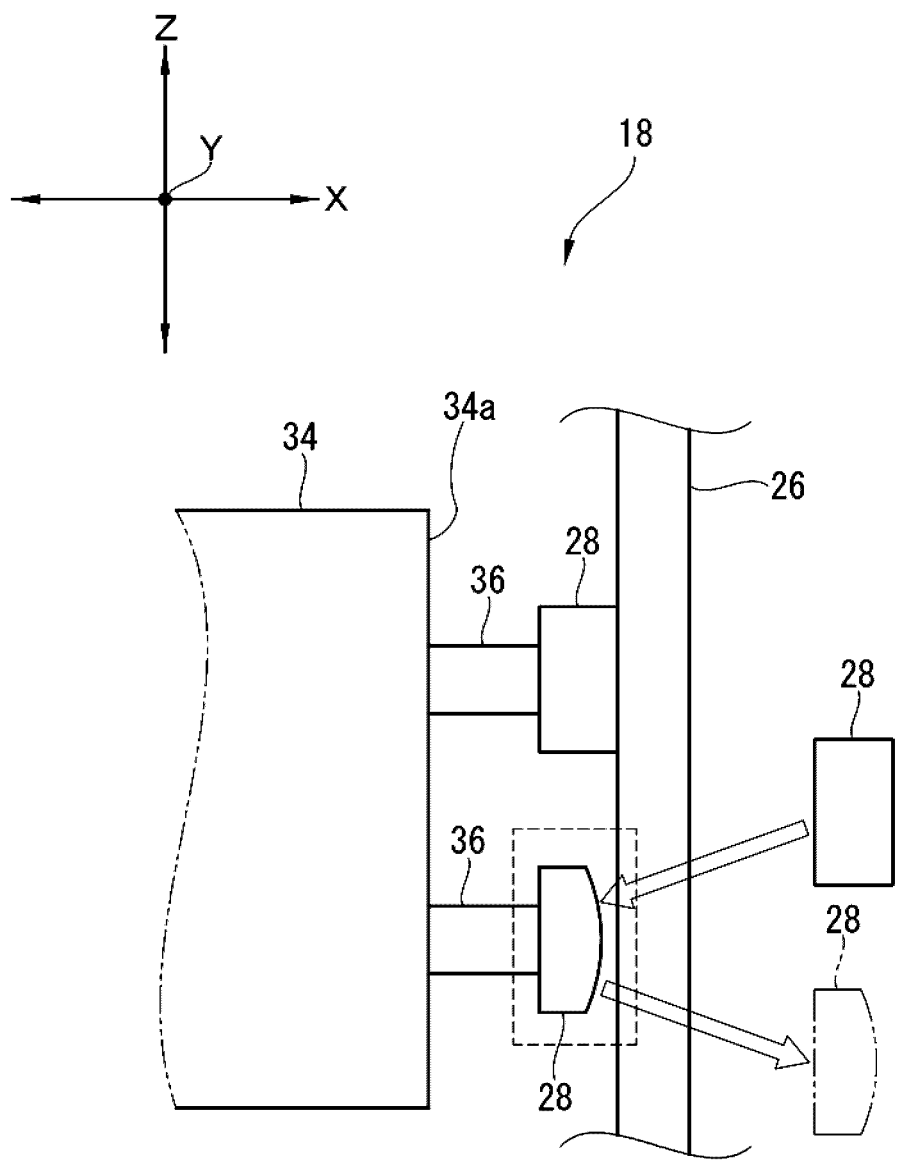
FIG. 5 is an explanatory view for illustrating modification 1 of a linear drive mechanism.

FIG. 5 is an explanatory view for describing modification 1 of the linear drive mechanism 18 of the present embodiment described above. The structure of modification 1 is basically the same as that of the linear drive mechanism 18 of the above-described embodiment, so that the components of the same function or structure as those of the above-described embodiment are designated by the same reference numerals, and a description thereof will be left out.

As shown in FIG. 5, in modification 1, each friction pad 28 is provided so as to be freely detachable from each pad support member 36, that is, so as to be replaceable. As a result, in a case where the friction pad 28 is worn by the sliding contact with the guide 26 as indicated by the dotted-line frame of FIG. 5, it is possible to replace the worn friction pad 28 with a new friction pad 28. As a result, it is possible to improve the maintenability of the linear drive mechanism 18.

Modification 2

Figure 6:
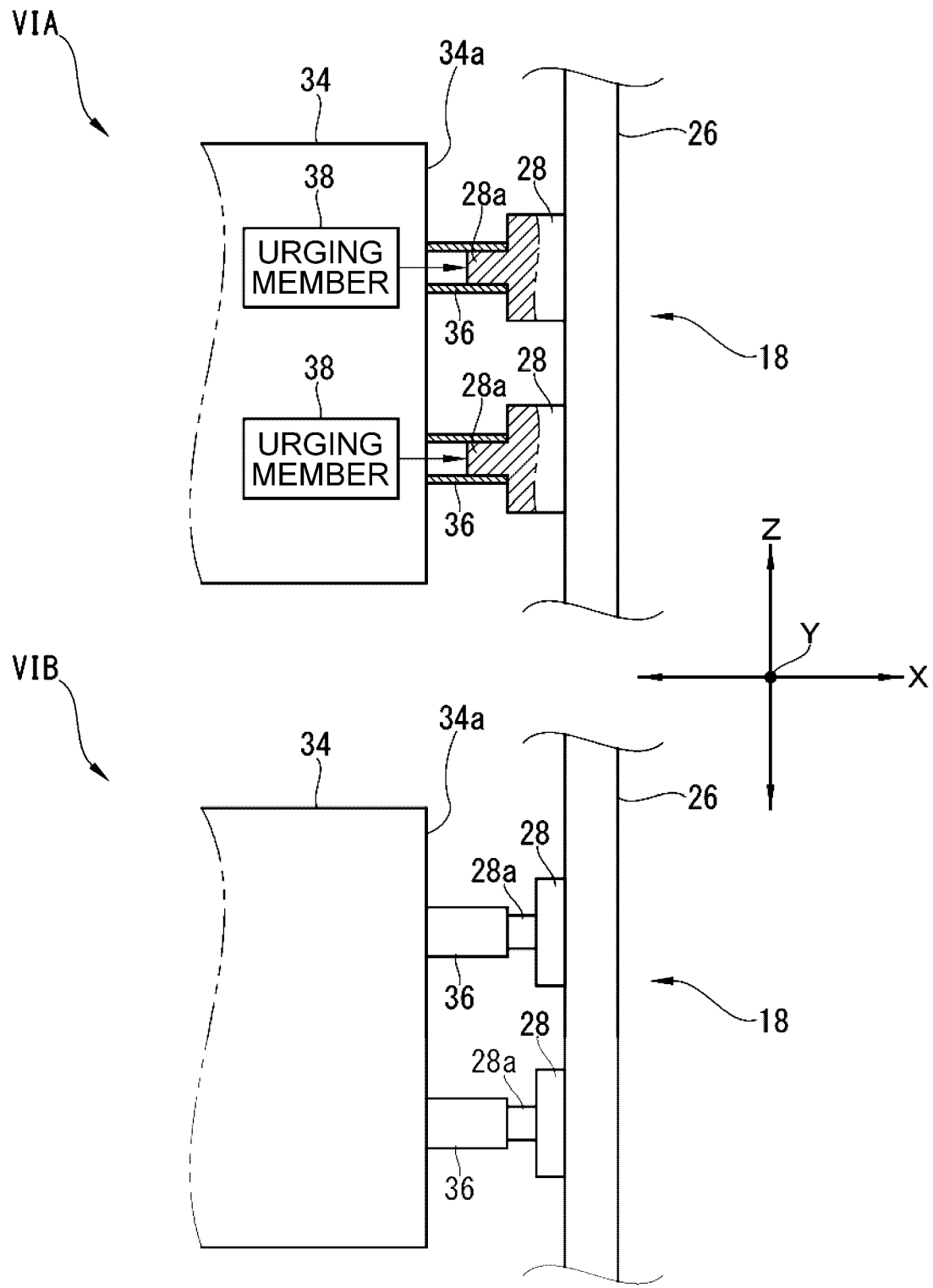
FIG. 6 is an explanatory view for illustrating modification 2 of the linear drive mechanism.

FIG. 6 is an explanatory view for illustrating modification 2 of the linear drive mechanism 18 of the above embodiment. Modification 2 is basically of the same structure as linear drive mechanism 18 of the above embodiment, so the components that are of the same function or structure as those of the above embodiment are designated by the same reference numerals, and a description thereof will be left out.

As indicated by the symbol VIA of FIG. 6, each pad support member 36 of the linear drive mechanism 18 of modification 2 is formed in a tubular shape. Further, the surface on the guide opposing surface 34a side of each friction pad 28 is provided with a fit-engagement portion 28a to be fit-engaged with the pad support member 36 respectively supporting each friction pad 28. As a result, each pad support member 36 supports the friction pad 28 so as to be movable in the X-axis direction.

Inside the carriage 34 (or inside each pad support member 36), an urging member 38 is provided for each friction pad 28. The urging members 38 urge the friction pads 28 toward the opposing guides 26, respectively, via the fit-engagement portions 28a with a fixed urging force. There are no particular restrictions regarding this urging member 38 so long as it can urge (press) each friction pad 28 with a fixed urging force. It may be one utilizing a restoring force such as a spring, one utilizing electromagnetic force such as a solenoid, or one utilizing compressed air. As a result, each friction pad 28 is constantly pressed against the opposing guide 26 by each urging member 38 with a fixed urging force.

Thus, as indicated by symbol VIB, in modification 2, even in a case where each friction pad 28 has been worn as a result of the sliding contact with the opposing guide 26, the state is maintained in which each friction pad 28 is pressed against the corresponding guide 26 with a fixed urging force. As a result, a substantially fixed friction force (static friction force, dynamic friction force) is maintained between each friction pad 28 and the corresponding guide 26. As a result, even when each friction pad 28 has been worn, there is no need to change the control parameter when moving the carriage 34 (e.g., the magnitude of the electric current applied to the coil in the carriage 34). Thus, it is possible to simplify the movement control of the carriage 34.

Modification 3

Figure 7:
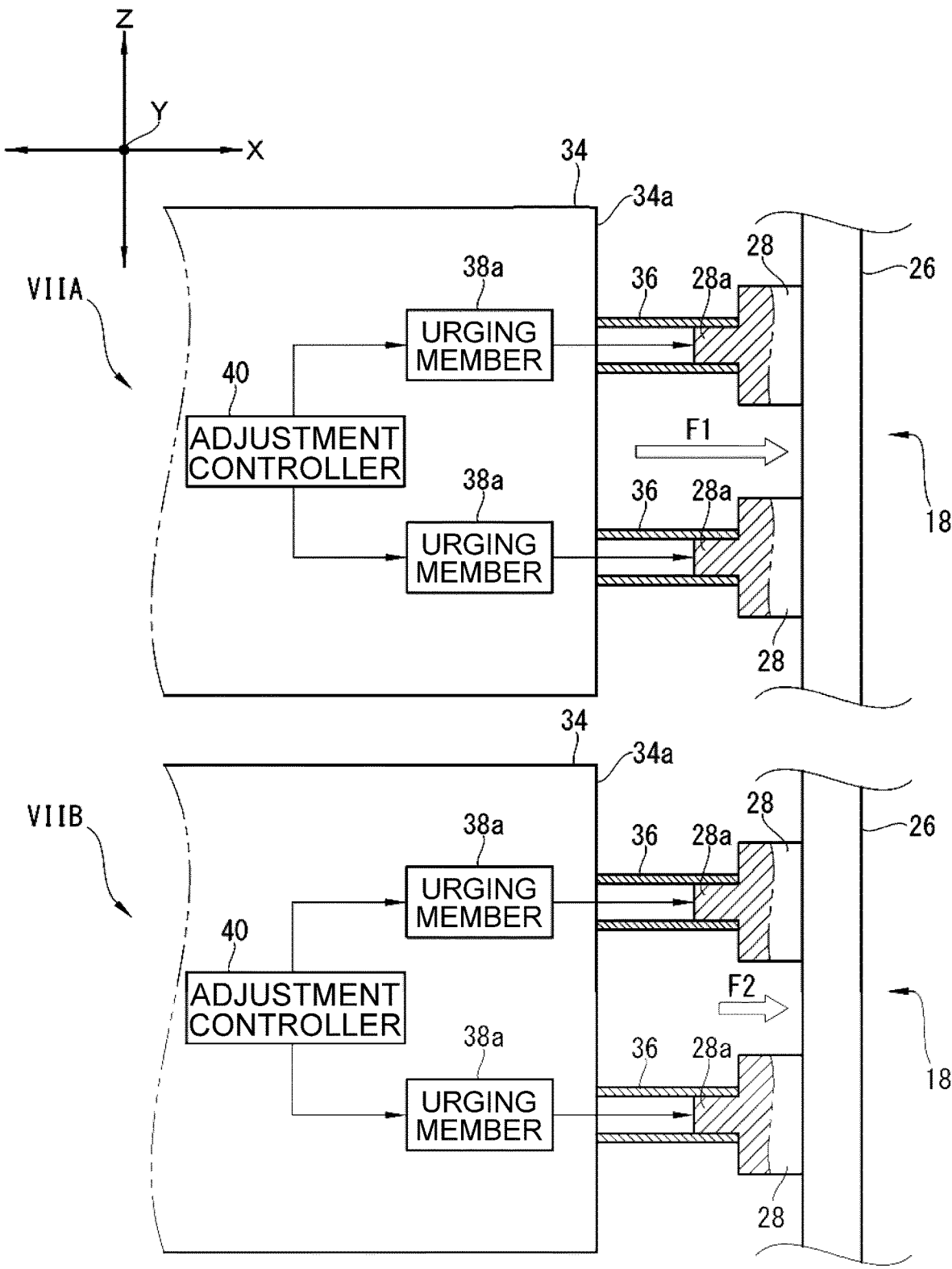
FIG. 7 is an explanatory view for illustrating modification 3 of the linear drive mechanism.

FIG. 7 is an explanatory view for illustrating modification 3 of the linear drive mechanism 18 described above. Modification 3 is basically of the same structure as modification 2 described above except that it includes: an urging member 38a different from the urging member 38; and an adjustment controller 40. Thus, the components that are of the same function and structure as those of modification 2 described above are designated by the same reference numerals, and a description thereof will be left out.

As indicated by symbol VIIA of FIG. 7, each urging member 38a differs from each urging member 38 of modification 2 in that the urging force (pressurization force) with which each friction pad 28 is urged (pressed) toward the side of the opposing guide 26 is variable. There are no particular restrictions regarding each urging member 38a so long as it can vary the urging force (pressurization force) with respect to each friction pad 28. It may be one utilizing a restoring force such as a spring, one utilizing an electromagnetic force such as a solenoid, or one utilizing compressed air.

The adjustment controller 40 adjusts the urging force applied to each friction pad 28 by each urging member 38a. As a result, when the urging force of each urging member 38a is increased, the abovementioned resistance force (static friction force and dynamic friction force) generated when each friction pad 28 comes into contact (sliding contact) with the opposing guide 26 increases. Conversely, when the urging force of each urging member 38a is reduced, the abovementioned resistance force is reduced. That is, the adjustment controller 40 can adjust (control) the magnitude of the resistance force which is generated by each friction pad 28 and which resists against the movement of the carriage 34.

For example, in a case where the carriage 34 halts on the drive shaft 32, the adjustment controller 40 adjusts the urging force F1 due to each urging member 38a to be large. As a result, it is possible to increase the locking force (static friction force) locking the carriage 34 at that stop position by each friction pad 28 when the carriage 34 halts, so that it is possible to reliably prevent the carriage 34 from being moved by an external force. As a result, it is possible to further improve the positioning accuracy of the linear motor 22.

On the other hand, as indicated by symbol VIIB of FIG. 7, in a case where the carriage 34 moves along the drive shaft 32, the adjustment controller 40 adjusts the urging force F2 of each urging member 38a to be small (F1>F2). As a result, because it is possible to reduce the resistance force (dynamic friction force) generated by each friction pad 28 when the carriage 34 is moving, it is possible to suppress the vibration of the carriage 34 and to improve the linear movement accuracy thereof. In this case, the adjustment controller 40 may perform adjustment such that the urging force F2 of each urging member 38a is reduced to zero. In a case where the urging force F2 of each urging member 38a is reduced to zero, each friction pad 28 may be retracted (spaced away) from each guide 26.

Further, in a case where the carriage 34 moves along the drive shaft 32, the adjustment controller 40 increases or decreases the urging force F2 applied by each urging member 38a, whereby it is possible to adjust the moving speed of the carriage 34.

Modification 4

Figure 8:
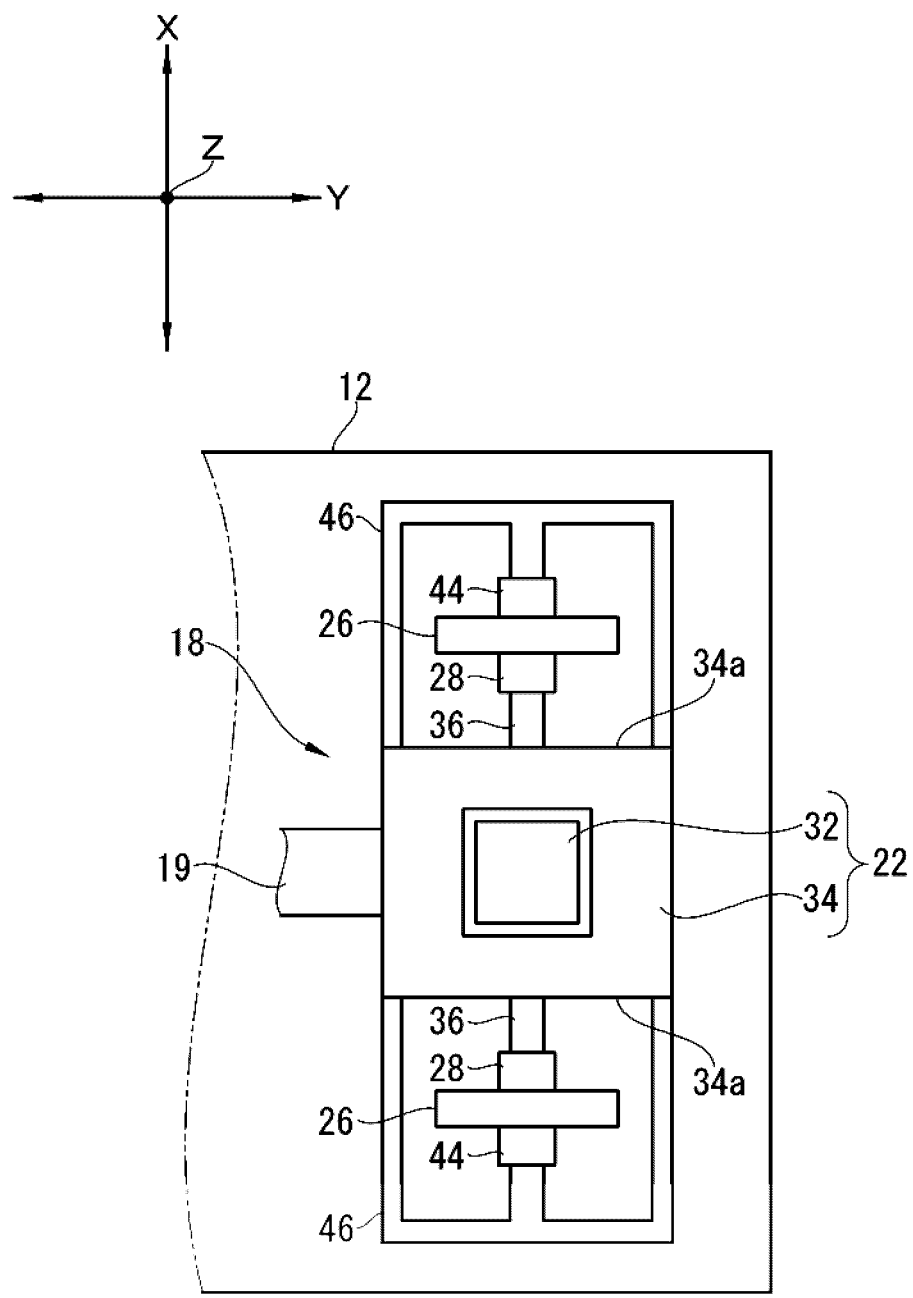
FIG. 8 is an explanatory view for illustrating modification 4 of the linear drive mechanism.

FIG. 8 is an explanatory view for illustrating modification 4 of the linear drive mechanism 18 of the above-described embodiment. Modification 4 is basically of the same structure as the linear drive mechanism 18 of the above-described embodiment except that it includes friction pads 44 and pad support members 46 whose numbers are the same as the number of the friction pads 28. Thus, the components that are of the same function and structure as those of the above-described embodiment are designated by the same reference numerals, and a description thereof will be left out.

As shown in FIG. 8, each friction pad 44 is basically the same as each friction pad 28 of the above-described embodiment, and corresponds to the friction member (resistance force generating portion) of the present invention. Each friction pad 44 is supported by the carriage 34 via each pad support member 46.

Each pad support member 46 is provided on the carriage 34. Each pad support member 46 supports each of the friction pads 44 at a position where the corresponding guide 26 is supported between each friction pad 44 and each friction pad 28 in the X-axis direction. The pressure when each friction pad 44 is brought into contact with each opposing guide 26 by each pad support member 46 is adjusted to the same pressure as when each friction pad 28 is brought into contact with each opposing guide 26. As a result, in the X-axis direction, the guides 26 are respectively held (clamped) by a plurality of sets of friction pads 28, 44.

Figure 9:
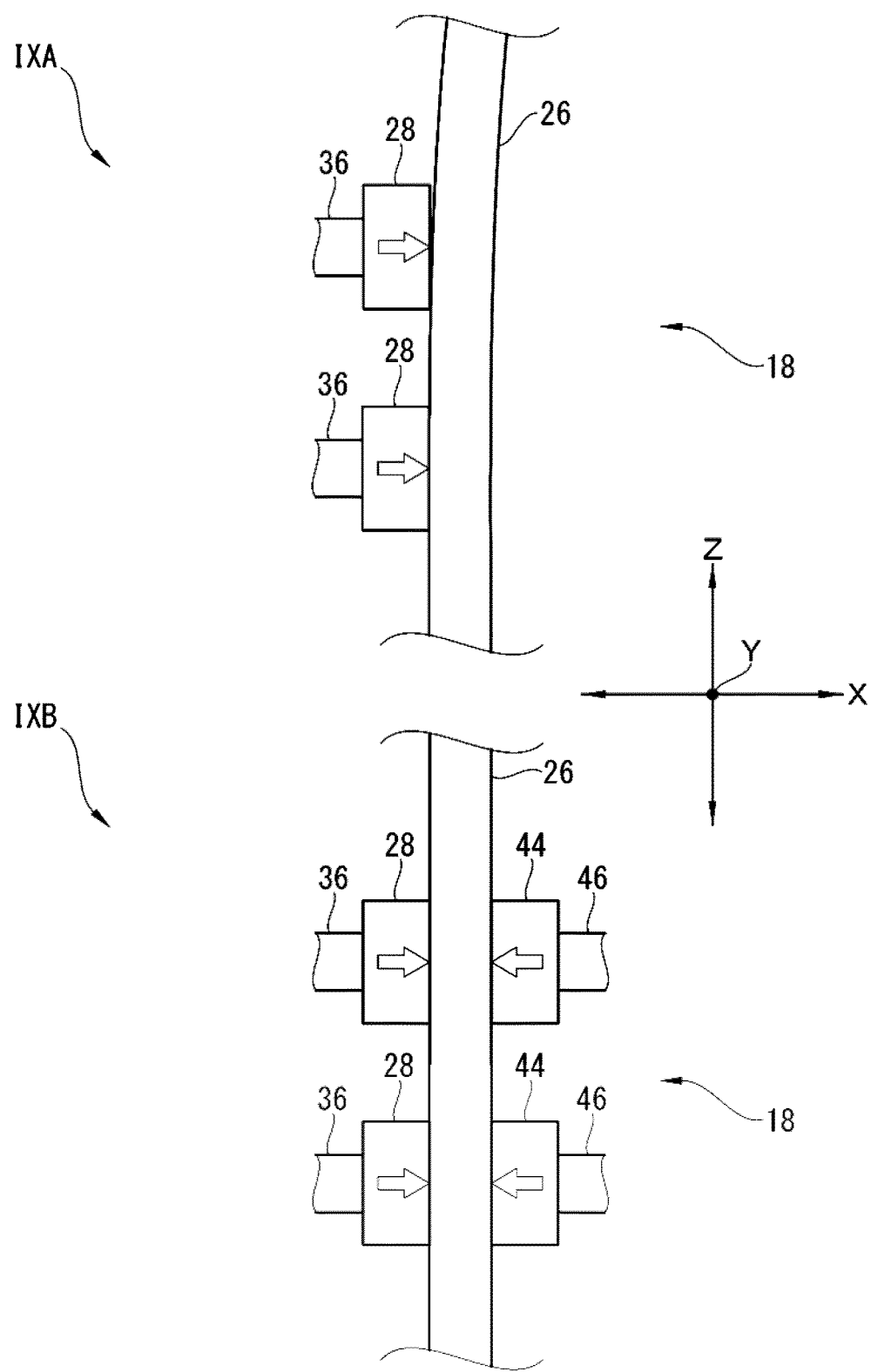
FIG. 9 is an explanatory view for illustrating an effect of modification 4.

FIG. 9 is an explanatory view for illustrating the effect of modification 4. As indicated by symbol IXA of FIG. 9, in a case where each guide 26 is pressed by each friction pad 28 only from one direction side in the X-axis direction, there is a fear of generation of deflection, deformation, movement, etc., of each guide 26. In contrast, as indicated by symbol IXB of FIG. 9, in modification 4, each guide 26 is held by each friction pad 28, 44 with the same force in the X-axis direction. As a result, the force applied to each guide 26 from each friction pad 28 and the force applied to each guide 26 from each friction pad 44 offset each other. As a result, it is possible to prevent generation of deflection, deformation, movement, etc. of each guide 26.

Modification 5

Figure 10:
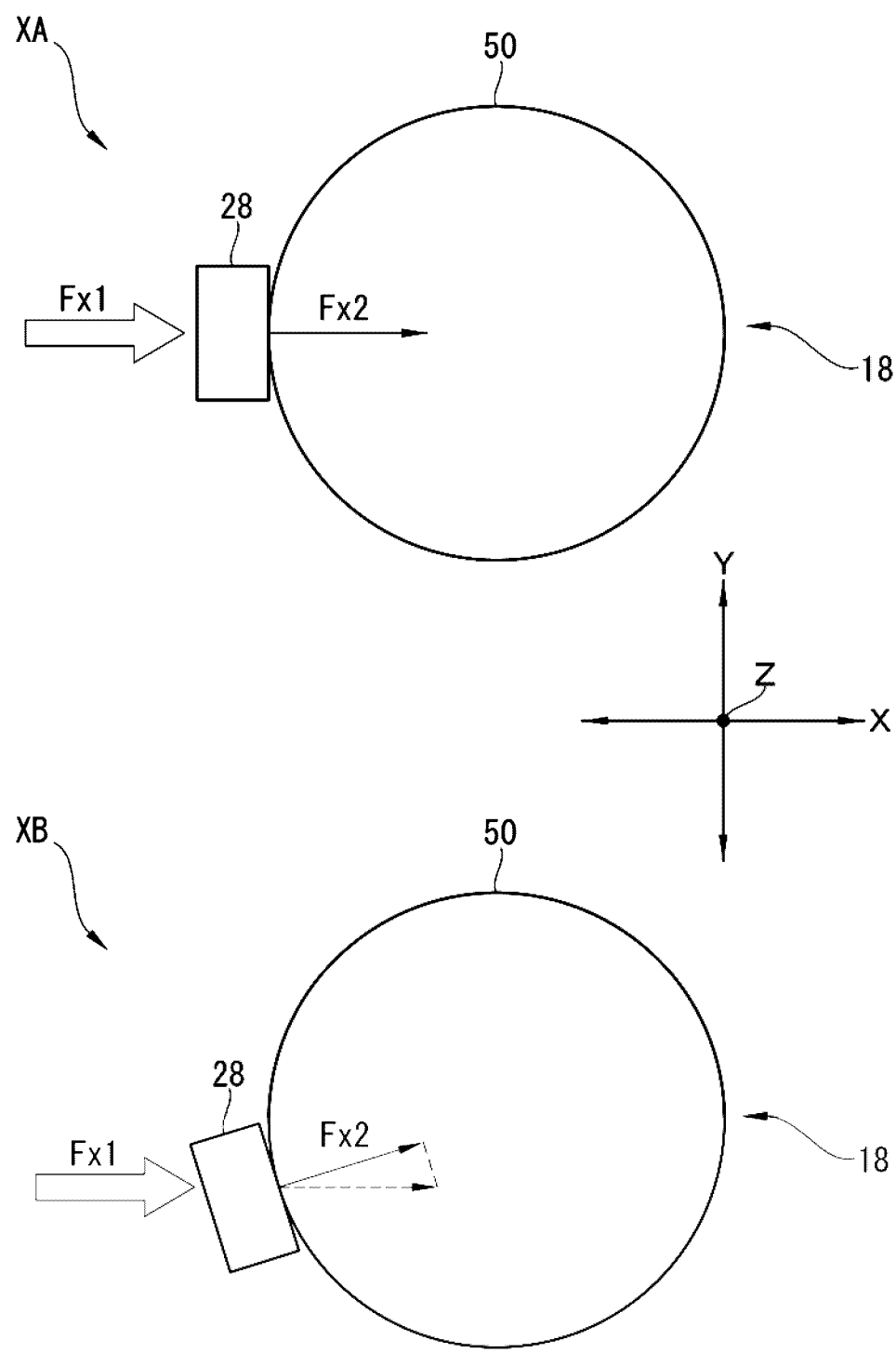
FIG. 10 is an explanatory view for illustrating modification 5 of the linear drive mechanism.

FIG. 10 is an explanatory view for illustrating modification 5 of the linear drive mechanism 18 of the above-described embodiment. Modification 5 is basically of the same structure as the linear drive mechanism 18 of the above-described embodiment except that it includes a pair of guides 50 different from the pair of guides 26. Thus, the components that are of the same function or structure of those of the above-described embodiment are designated by the same reference numerals, and a description thereof will be left out.

As shown in FIG. 10, each guide 50 has a columnar shape extending in the Z-axis direction. Thus, as indicated by symbol XA of FIG. 10, in a case where the position of each friction pad 28 coincides with the position of the central axis of each guide 50 in the Y-axis direction, the force Fx1 with which each pad support member 36 (or the urging member 38, 38a) presses each friction pad 28 toward the guide 26 is substantially equal to the force Fx2 applied in the central axis direction of the guide 50 from each friction pad 28.

On the other hand, as indicated by symbol XB of FIG. 10, in a case where, in the Y-axis direction, the position of each friction pad 28 is deviated from the position of the central axis of each guide 50, the force Fx2 applied in the central axis direction of the guide 50 from each friction pad 28 is smaller than the force Fx1 with which each pad support member 36 or the like presses each friction pad 28 toward the guide 26. Thus, by changing the contact position (pressing position) of each friction pad 28 with respect to the guide 50 in the Y-axis direction, it is possible to adjust the magnitude of the force Fx2 applied in the central axis direction of the guide 50 from the friction pad 28. The force Fx2 is proportional to the resistance force (static friction force, dynamic friction force) which resists against the movement of the carriage 34.

Figure 11:
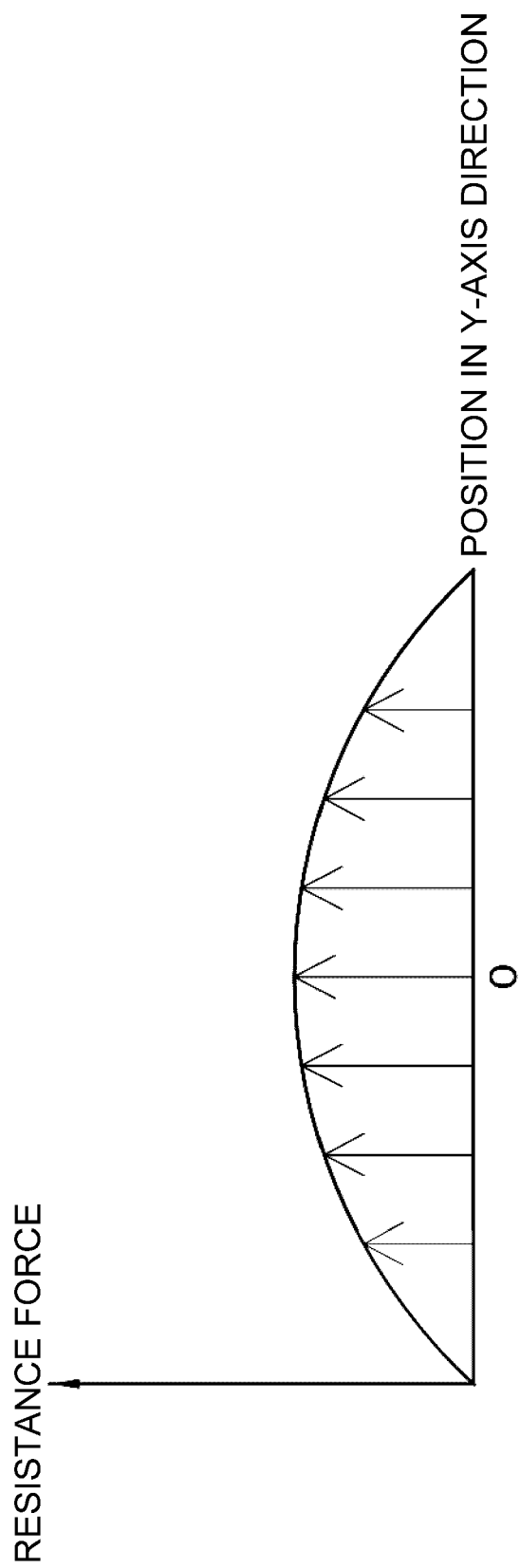
FIG. 11 is a graph illustrating a change in a resistance force against the movement of a carriage in modification 5.

FIG. 11 is a graph illustrating a change in the resistance force which resists against the movement of the carriage 34 in modification 5. The horizontal axis in FIG. 11 indicates the position in the Y-axis direction of each friction pad 28, and the "0" of the horizontal axis indicates that the position in the Y-axis direction of each friction pad 28 coincides with the position of the central axis of each guide 50.

As shown in FIG. 11, in modification 5, the guides 50 respectively having a columnar shape enable to adjust the resistance force which resists against the movement of the carriage 34, just by changing the contact position (pressing position) of each friction pad 28 with respect to the guide 50 in the Y-axis direction.

Modification 6

Figure 12:
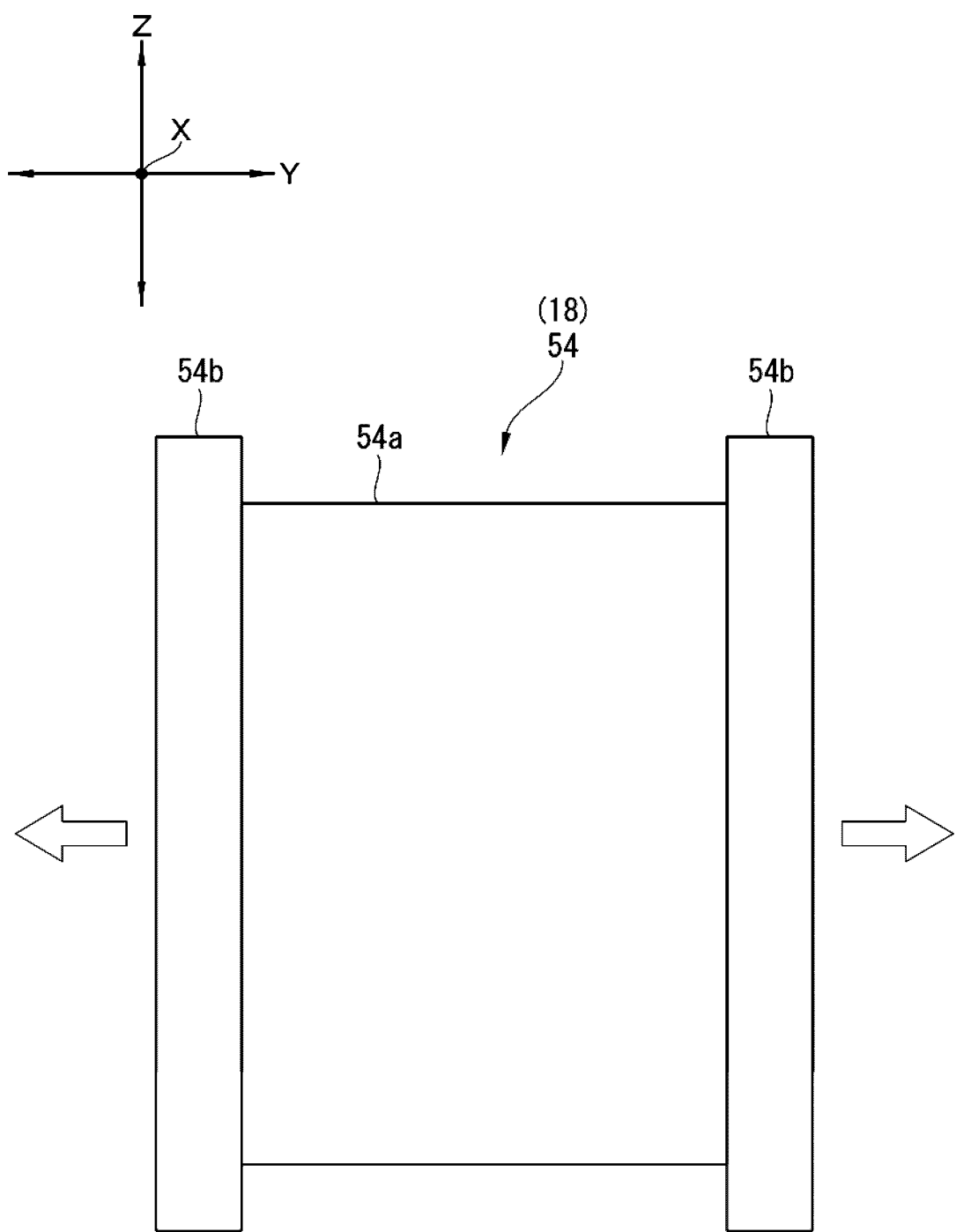
FIG. 12 is an explanatory view for illustrating modification 6 of the linear drive mechanism.

FIG. 12 is an explanatory view for illustrating modification 6 of the linear drive mechanism 18 of the above-described embodiment. Modification 6 is basically of the same structure as the linear drive mechanism 18 of the above-described embodiment except that it includes a pair of guides 54 different from the pair of guides 26. Therefore, the components that are of the same function or structure as those of the above-described embodiment are designated by the same reference numerals, and a description thereof will be left out.

As shown in FIG. 12, each guide 54 includes: a soft belt body 54a having a surface orthogonal to the X-axis direction (the surface that each friction pad 28 contacts); and tension imparting portions 54b respectively provided at both end portions in the Y-axis direction of the belt body 54a. The tension imparting portions 54b impart tension to the belt body 54a in a direction that both end portions of the belt body 54a in the Y-axis direction move away from each other. As a result, it is possible to enhance the flatness of the belt body 54a in the YZ-plane. Thus, it is possible to prevent the magnitude of the resistance force (static friction force, dynamic friction force) from changing (generating unevenness) depending upon the contact position where the friction pad 28 contacts with the belt body 54a. That is, it is possible to make the resistance force uniform independently of the contact position of the friction pad 28 with respect to the belt body 54a.

While in modification 6 tension is imparted to the belt body 54a in the Y-axis direction, it is also possible to impart tension in the Z-axis direction.

Modification 7

Figure 13:
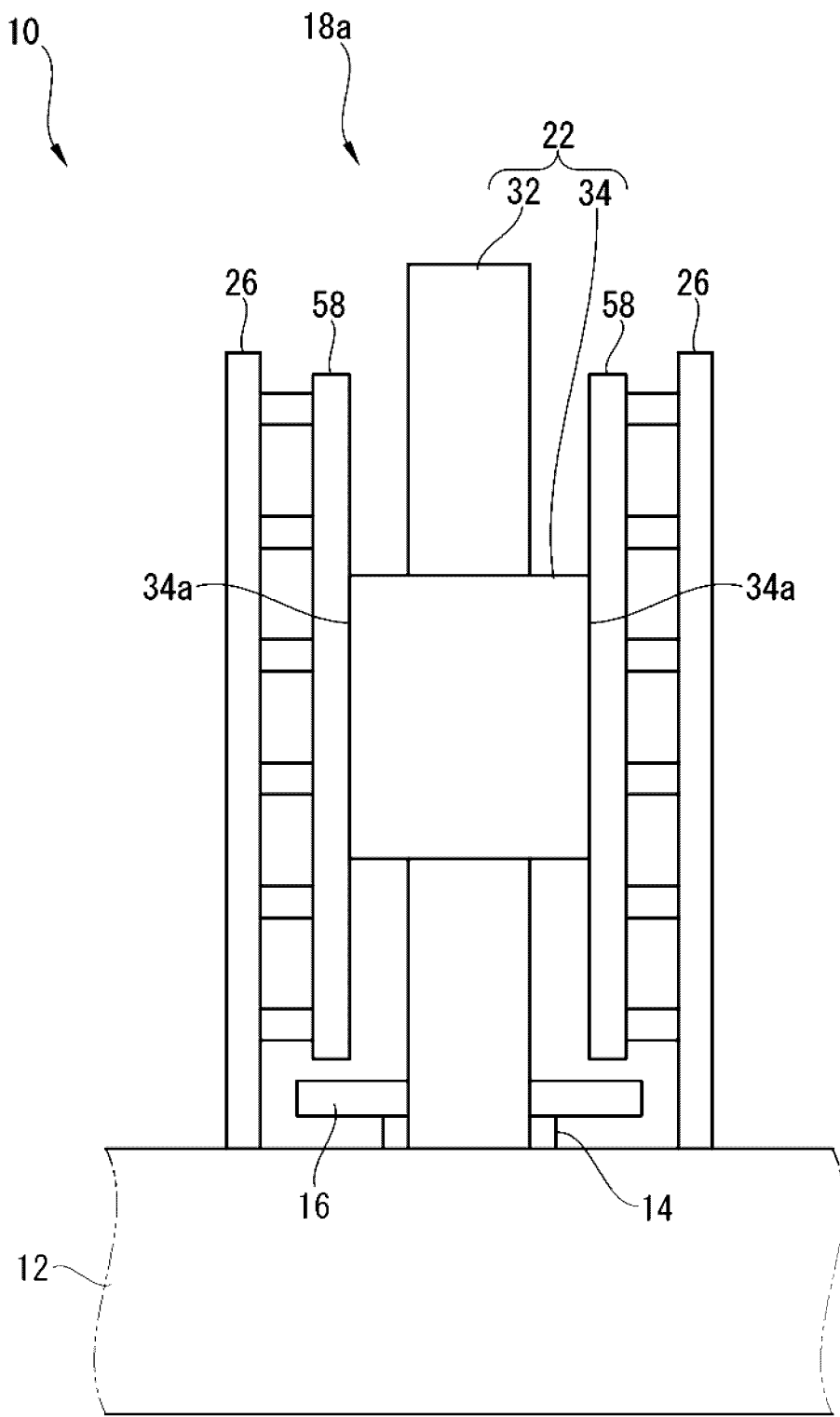
FIG. 13 is an explanatory view for illustrating modification 7 of the linear drive mechanism.

FIG. 13 is an explanatory view for illustrating a linear drive mechanism 18a according to modification 7 of the linear drive mechanism 18 of the above-described embodiment. The linear drive mechanism 18a is basically of the same structure as the linear drive mechanism 18 of the above-described embodiment except for a part thereof, so the components that are of the same function of structure as those of the above-described embodiment are designated by the same reference numerals, and a description thereof will be left out.

While in the above-described embodiment each friction pad 28 is provided on the carriage 34, in the linear drive mechanism 18a of modification 7 as shown in FIG. 13, friction plates 58 [which corresponds to the friction member of the present invention (the resistance force generating portion)] are provided on the surfaces of respective guides 26 opposite the carriage 34. In addition, each friction plate 58 is brought into contact with each guide opposing surface 34a of the carriage 34. As a result, it is possible to attain the same effect as that of the above-described embodiment.

Instead of providing each friction pad 28 and each friction plate 58, it is possible to provide at least one of: each guide opposing surface 34a of the carriage 34; and each surface on a side facing the carriage 34 of each guide 26, as a friction surface (the resistance force generating portion of the present invention).

Modification 8

In the above embodiment and respective modifications, the roundness measuring machine 10 having the linear drive mechanism 18, 18a has been described by way of example. Further, the present invention is applicable to various shape measuring machines which measure various shapes of the workpiece W.

FIG. 14 is a side view of a detector 62 of a surface shape measuring machine 60 which measures a surface shape (surface roughness, swell, etc.) of a measuring surface of a workpiece W of an arbitrary shape. As shown in FIG. 14, the surface shape measuring machine 60 includes the detector 62 and a linear drive mechanism 70.

The detector 62 has: a stylus 64 attached thereto so as to be swingable around a swing fulcrum which is parallel to the X-axis direction; and a probe 66 provided at a distal end side of the stylus 64. Thus, the detector 62 has sensitivity in the Y-axis direction.

In this surface shape measuring machine 60, in a state in which the probe 66 of the detector 62 is brought into contact with the measuring surface of the workpiece W, the detector 62 is moved in the Z-axis direction with respect to the workpiece W by the linear drive mechanism 70, described below, whereby the displacement in the Y-axis direction of the stylus 64 (probe 66) is detected while tracing the measuring surface of the workpiece W with the probe 66. Based on the displacement measurement result, the surface shape of the measuring surface of the workpiece is obtained.

FIG. 15 is a plan view of the linear drive mechanism 70 of the surface shape measuring machine 60. As shown in FIG. 15, the linear drive mechanism 70 includes a linear motor 72, a pair of guides 74, a friction pad 78, and a connection member 80.

The linear motor 72 is basically the same as the linear motor 22 of the above-described embodiment. The linear motor 72 includes: a drive shaft 82 which is a stator; and a carriage 84 which is a mover.

The drive shaft 82 is basically the same as the drive shaft 32 of the above-described embodiment. The drive shaft 82 is supported on the measuring surface of the workpiece W at a position shifted in the X-axis direction with respect to the detector 62, by a shaft support member (not shown). Further, the drive shaft 82 has a shape extending in the Z-axis direction.

The carriage 84 is basically the same as the carriage 34 of the above-described embodiment. The carriage 84 is supported by the drive shaft 82 in a non-contact fashion so as to be movable in the Z-axis direction. On guide opposing surfaces 84*a* of the carriage 84 respectively face a pair of guides 74 described below, there are provided a plurality of pad support members 86 which support the friction pads 78.

The pair of guides 74 are basically the same as the pair of guides 26 of the above-described embodiment, and has a plate shape parallel to the YZ-plane and extending in the Z-axis direction. The guides 74 are provided so as to be respectively situated on one direction side and the other direction side in the X-axis direction with respect to the drive shaft 82. In other words, in the X-axis direction, the drive shaft 82 is situated between the pair of guides 74.

As in the above-described embodiment, the friction pads 78 are retained (held) by the carriage 84 via pad support members 86, and are respectively brought into contact with the guides 74 facing the friction pads 78 with a predetermined pressure by the pad support members 86. Thus, in the linear drive mechanism 70, when the carriage 84 is moved in the Z-axis direction, this carriage 84 vibrates in the X-axis direction which is orthogonal to the Y-axis direction that is the sensitivity direction of the detector 62.

The connection member 80 connects the detector 62 and the carriage 84. Therefore, in a case where the linear drive mechanism 70 is driven to move the carriage 84 in the Z-axis direction, the detector 62 moves integrally with the carriage 84 in the Z-axis direction. As a result, as described above, it is possible to trace the measuring surface of the workpiece W in the Z-axis direction with the probe 66 of the detector 62.

As described above, also in the linear drive mechanism 70, the arrangement of the guides 74 and the friction pads 78 is adjusted, whereby it is possible to adjust the direction of the abovementioned vibration in a direction (X-axis direction) orthogonal to the sensitivity direction (Y-axis direction) of the detector 62 while securing the positioning accuracy of the linear motor 72. As a result, when performing surface shape measurement on the measuring surface of the workpiece W by the detector 62, it is possible to suppress a reduction in the measurement accuracy.

Apart from the roundness measuring machine 10 and the surface shape measuring machine 60, the linear drive mechanism of the present invention is applicable to various shape measuring machines (e.g., a three-dimensional coordinate measuring machine) having a linear drive mechanism which moves various detectors linearly in at least one direction.

Others

While in the above-described embodiment and in the modifications two friction pads 28 are arranged side by side in the Z-axis direction for each guide opposing surface 34*a*, there are no particular restrictions regarding the number and arrangement pattern of the friction pads 28 (the pad support members 36) for each guide opposing surface 34*a*. Similarly, the number and arrangement pattern of the friction pads 44 (pad support members 46) and the friction pads 78 (pad support members 86) may be changed as appropriate.

While a contact type detector having the probe 20*a*, 66 is explained as an example of the detector 20, 62 in the embodiment and modifications described above, the detector 20, 62 may also be, for example, a non-contact type detector such as a laser probe.

While the pair of guides 26, 74 are provided so as to hold the drive shaft 32, 82 therebetween in the X-axis direction in the embodiment and modifications described above, it is also possible to provide only one of the pair of guides 26 (or the pair of guides 74).

While the detector 20, 62 is moved in the Z-axis direction integrally with the carriage 34, 84 of the linear motor 22, 72 in the embodiment and modifications described above, it is also possible to move the workpiece W in the Z-axis direction integrally with the carriage 34, 84. Also, in this case, it is possible to move the detector 20, 62 relatively in the Z-axis direction with respect to the workpiece W.

While the linear motor 22, 72 is explained as an example of the drive source (drive unit) of the linear drive mechanism of the present invention in the embodiment and modifications described above, there are no particular restrictions regarding the drive source so long as it supports the carriage 34, 84 (mover) in a non-contact fashion by the drive shaft 32, 82 (stator) and it can move the carriage 34, 84 along the drive shaft 32, 82.

While the friction pad 28, 44, 78 and the friction plate 58 or the like are explained as an example of the resistance force generating portion in the embodiment and modifications described above, it is also possible to generate the resistance force by utilizing, for example, a magnetic force or the like, and there are no particular restrictions regarding the method of generating the resistance force which resist against the movement of the carriage 34, 84.

The present invention is not restricted to the above-described embodiment, and it goes without saying that various modifications can be made without departing from the scope of the gist of the present invention. Further, one or a plurality of the modifications may be combined with each other as appropriate.

REFERENCE SIGNS LIST

10 . . . roundness measuring machine
14 . . . table rotation mechanism
18, 18a . . . linear drive mechanism
20 . . . detector
22 . . . linear motor
26 . . . guide
28 . . . friction pad
32 . . . drive shaft
34 . . . carriage
38, 38a . . . urging member
40 . . . adjustment controller
44 . . . friction pad
50, 54 . . . guide
54a . . . belt body
54b . . . tension imparting portion
58 . . . friction plate
60 . . . surface shape measuring machine
62 . . . detector
70 . . . linear drive mechanism
72 . . . linear motor
74 . . . guide
78 . . . friction pad
82 . . . drive shaft
84 . . . carriage

What is claimed is:

1. A linear drive mechanism which moves a contact type or a non-contact type detector having sensitivity in a first axial direction, relatively to a workpiece in a second axial direction orthogonal to the first axial direction, the linear drive mechanism comprising:
   a drive shaft extending in the second axial direction;
   a mover which is supported in a non-contact fashion by the drive shaft and configured to move along the drive shaft integrally with the detector or the workpiece;
   a guide provided at a position deviated relative to the drive shaft in a third axial direction orthogonal to both the first axial direction and the second axial direction, the guide parallel to the drive shaft; and
   a resistance force generator which is provided on one of the mover and the guide, and is in contact with the other of the mover and the guide, the resistance force generator configured to generate a resistance force which resists against movement of the mover.

2. The linear drive mechanism according to claim 1, wherein
   the guide is provided on each of one direction side and another direction side of the third axial direction with respect to the drive shaft, and
   the resistance force generator is provided for each guide.

3. The linear drive mechanism according to claim 1, comprising an adjustment controller configured to adjust magnitude of the resistance force generated by the resistance force generator.

4. The linear drive mechanism according to claim 1, wherein
   the resistance force generator is provided on the mover, and holds the guide in the third axial direction.

5. The linear drive mechanism according to claim 1, wherein the resistance force generator is a friction pad.

6. The linear drive mechanism according to claim 5, wherein the friction pad is replaceably provided on the one of the mover and the guide.

7. The linear drive mechanism according to claim 5, comprising an urger configured to urge the friction pad toward the other of the mover and the guide.

8. The linear drive mechanism according to claim 5, wherein
   the friction pad is provided on the mover, and
   the guide has a columnar shape extending in the second axial direction.

9. The linear drive mechanism according to claim 5, wherein
   the friction pad is provided on the mover, and
   the guide includes: a belt body having a surface orthogonal to the third axial direction; and a tension imparter configured to impart tension to the belt body in the first axial direction or the second axial direction.

10. A shape measuring machine which measures a shape of a workpiece, comprising:
    a contact type or a non-contact type detector having sensitivity in a first axial direction; and
    the linear drive mechanism according to claim 1.

11. The shape measuring machine according to claim 10, wherein
    in a case where the workpiece is of a columnar or a cylindrical shape, and the shape of the workpiece to be measured is roundness of the workpiece,
    the shape measuring machine comprises a workpiece rotator configured to rotate the workpiece around a rotation axis parallel to the second axial direction,
    the drive shaft is provided at a position separated from the rotation axis in the first axial direction, and
    the mover retains the detector at a position facing an outer peripheral surface of the workpiece in the first axial direction.

* * * * *